US011847015B2

(12) United States Patent
Warkentin et al.

(10) Patent No.: US 11,847,015 B2
(45) Date of Patent: Dec. 19, 2023

(54) MECHANISM FOR INTEGRATING I/O HYPERVISOR WITH A COMBINED DPU AND SERVER SOLUTION

(71) Applicant: VMware, Inc., Palo Alto, CA (US)

(72) Inventors: Andrei Warkentin, South Elgin, IL (US); Sunil Kotian, San Jose, CA (US); Jared McNeill, Quispamsis (CA); Cyprien Laplace, Boston, MA (US); Shruthi Hiriyuru, Medford, MA (US)

(73) Assignee: VMware, Inc., Palo Alto, CA (US)

( * ) Notice: Subject to any disclaimer, the term of this patent is extended or adjusted under 35 U.S.C. 154(b) by 32 days.

(21) Appl. No.: 17/582,055

(22) Filed: Jan. 24, 2022

(65) Prior Publication Data
US 2023/0236916 A1 Jul. 27, 2023

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0778* (2013.01); *G06F 11/0793* (2013.01); *G06F 11/2284* (2013.01); *G06F 11/24* (2013.01)

(58) Field of Classification Search
CPC ............. G06F 11/0772; G06F 11/0778; G06F 11/0793; G06F 11/2284; G06F 11/24;
(Continued)

(56) References Cited

U.S. PATENT DOCUMENTS

| | | | |
|---|---|---|---|
| 6,393,496 B1 | 5/2002 | Schwaderer et al. | |
| 2004/0078669 A1* | 4/2004 | Lang | G06F 11/0748 |
| | | | 714/27 |

(Continued)

OTHER PUBLICATIONS

Sneed H M Ed—Wills L et al: "Encapsulating legacy software for use in client/server systems", Reverse Engineering 1996., Proceedings of the Third Working Conference E on Monterey, CA, USA Nov. 8-10, 1996, Los Alamitos, CA, USA, IEEE Comput. Soc, US, Nov. 8, 1996 (Nov. 8, 1996), pp. 104-119, XP010201974, DOI: 10.1109/WCRE.1996.558885 ISBN: 978-0-8186-7674-1 the whole document.

(Continued)

*Primary Examiner* — Joseph D Manoskey
(74) *Attorney, Agent, or Firm* — Thomas | Horstemeyer, LLP

(57) ABSTRACT

A combined data processing unit (DPU) and server solution with DPU operating system (OS) integration is described. A DPU OS is executed on a DPU or other computing device, where the DPU OS exercises secure calls provided by a DPU's trusted firmware component, that may be invoked by DPU OS components to abstract DPU vendor-specific and server vendor-specific integration details. An invocation of one of the secure calls made on the DPU to communicate with its associated server computing device is identified. In an instance in which the one of the secure calls is invoked, the secure call invoked is translated into a call or request specific to an architecture of the server computing device and the call is performed, which may include sending a signal to the server computing device in a format interpretable by the server computing device.

17 Claims, 5 Drawing Sheets

(51) Int. Cl.
*G06F 11/22* (2006.01)
*G06F 11/24* (2006.01)

(58) Field of Classification Search
CPC ............. G06F 11/0779; G06F 11/0745; G06F 11/0748; G06F 11/0766; G06F 11/3006
See application file for complete search history.

(56) References Cited

U.S. PATENT DOCUMENTS

| | | | | |
|---|---|---|---|---|
| 2010/0058088 A1* | 3/2010 | Busch | .................. | G06F 1/3203 |
| | | | | 713/323 |
| 2013/0046942 A1* | 2/2013 | Namba | ................ | G06F 3/0688 |
| | | | | 711/E12.001 |
| 2015/0341630 A1* | 11/2015 | Zheng | .................... | G09G 3/006 |
| | | | | 348/189 |
| 2021/0232693 A1* | 7/2021 | Leenstra | ................ | G06F 12/10 |
| 2023/0105413 A1* | 4/2023 | Butcher | ............. | G06F 13/4022 |
| | | | | 710/104 |

OTHER PUBLICATIONS

International Search Report and Written Opinion in PCT/US2023/011058 dated Apr. 4, 2023.

\* cited by examiner

MECHANISM FOR INTEGRATING I/O HYPERVISOR WITH A COMBINED DPU AND SERVER SOLUTION

BACKGROUND

Data centers and other computing infrastructure employ various types of physical hardware, such as central processing units (CPUs), graphics processing units (GPUs), network interface cards (NICs), data processing units (DPUs), memory storage, and the like. Using the physical hardware, data centers host customer workloads. Some customer workloads include computing resources that are virtualized by a hypervisor to offer a multitude of virtual machines (VMs) that serve up virtualized computing software and hardware, for example.

In some server designs and scenarios, it is beneficial to offload input/output (I/O) functions, and acceleration and management tasks in a server to a DPU. A DPU is a networking oriented microserver, combining general purpose compute with high-performance networking and storage I/O and offloads, packaged into a server adapter form factor and physically part of a computer server via PCIe, CCIX, CXL, GenZ, NVLINK, CAPI, AXI or other busses and I/O fabrics. Other accepted industry names for a DPU include SmartNIC or intelligent processing unit (IPU), but there can be other classes of "intelligent" I/O adapters general purpose compute, such as computational storage devices (CSDs) and GPUs.

A DPU runs a DPU operating system also known as an I/O hypervisor. The DPU operating system (OS) multiplexes I/O accelerators and implements additional I/O services presented towards the server that contains the DPU device, either by implementing additional I/O devices (such PCIe functions) or by pre- and post-processing (or filtering) the data passing through the I/O device. A good example of such processing for DPUs is a firewall application. The DPU OS also separates I/O management from the server hypervisor performing workload management, thereby separating server (workload) tenant privileges from underlying networking/storage infrastructure management privileges.

As such, the DPU operating system provides increased access to and control of underlying hardware resources, and allows bringing the inherent value of I/O virtualization present in hypervisors to support bare-metal workloads (that is, workloads running on the server without a supported hypervisor, such as Linux™ containers). However, DPUs come from different manufacturers. In combination with multiple server manufacturers, this leads to many vendor-specific aspects to integration everything together to form a solution.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
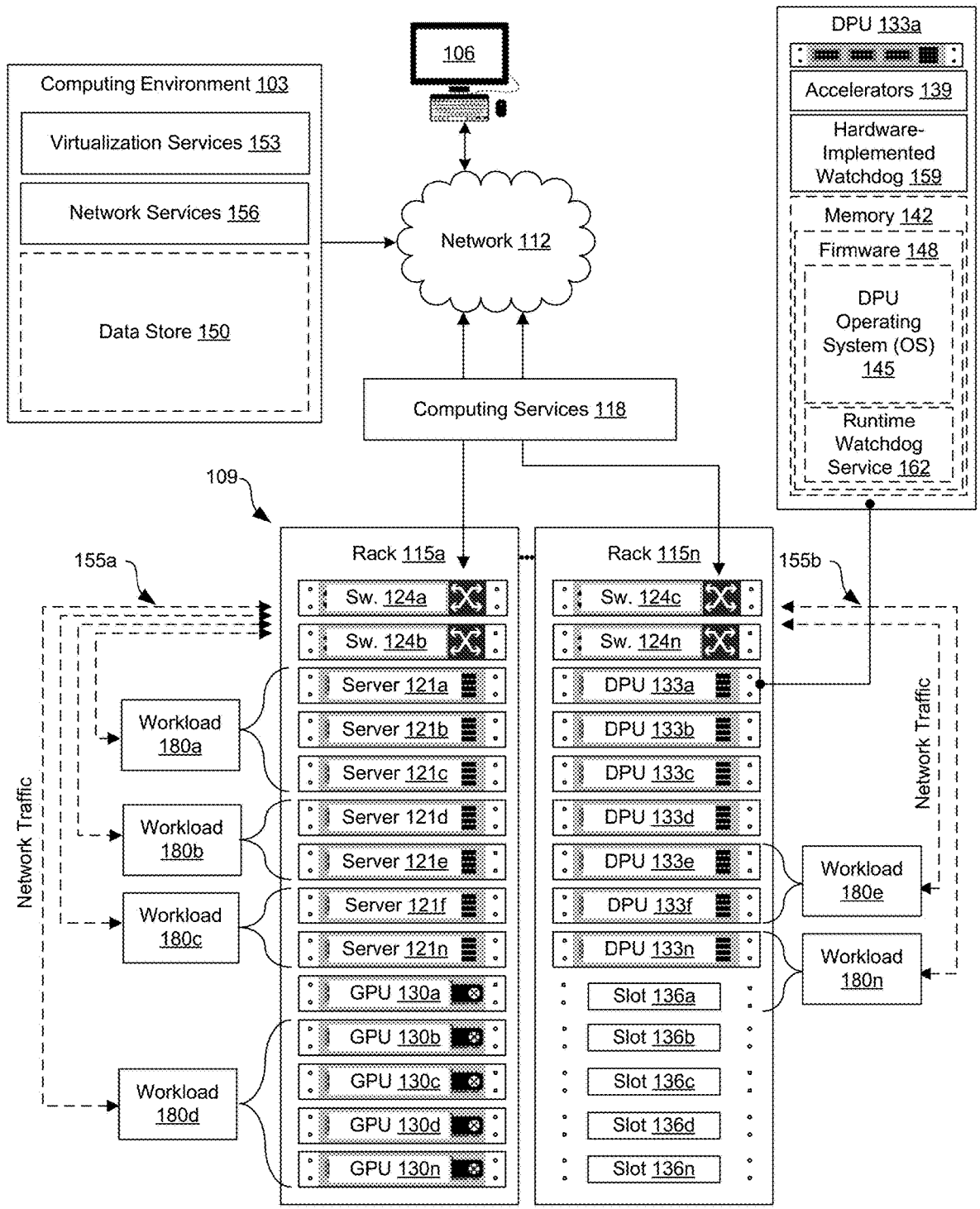
FIG. 1 is a drawing of an example of a combined DPU and server solution.

The present disclosure relates to DPU operating system integration in a combined server and DPU solution, where the DPU may include varying types of models, versions, and original equipment manufacturer (OEM) devices. DPU operating systems are now being deployed and optimized for execution on DPUs and similar types of computing devices. DPUs may include implementations based on the 64-bit Arm® architecture, and/or other similar computing devices that perform operations similar to traditional servers.

It is desirable to have a DPU operating system that can support a multitude of types of DPUs, regardless of make, model, version, manufacturer, or the like. Additionally, it is desirable to abstract various aspects via a vendor-neutral interface to support a single binary version of a DPU operating system. Notably, various network service providers desire to employ DPU operating systems in various solutions that consist of DPUs and other types of computing devices from different vendors and servers from different original equipment manufacturers. However, how a DPU communicates with server baseboard management controller (BMC) or server firmware may differ from device to device. In order to handle different types of DPUs, a DPU operating system would need to be deployed in a multitude of differing software images for varying types of devices. It is attractive, however, to have a single DPU operating system and/or operating system (OS) image and identical code paths as much as possible among varying types of computing devices.

Aspects where per-DPU and per-OEM adaptation differ include low-level signaling from a DPU OS, such as faults, service status, diagnostic status sent to a platform, such as BMC and/or server firmware. Other aspects where per-DPU and per-OEM adaptation differ include high-level protocol signaling from the DPU OS to the BMC and platform (e.g., BMC and server firmware) signaling to the DPU OS (e.g., shutdown, non-maskable interrupts (NMIs), and so forth).

Accordingly, various embodiments for DPU OS integration in a combined server and DPU or the like solution are described. In some embodiments, a system is described that includes a server computing device and a network computing device (e.g., a DPU or the like) communicatively coupled to one another, where each comprises at least one hardware processor. Program instructions are stored in memory that, when executed by the at least one hardware processor of the network computing device, direct the network computing device, or other desired device, to execute a DPU OS on the network computing device, where the DPU OS exercises secure calls (e.g., secure firmware calls on ARM® architecture, for example), that are implemented by DPU vendor-specific trusted firmware. The network computing device-trusted firmware may further identify an invocation of one of the secure calls made by the DPU OS on the network computing device to communicate with the server computing device and, when invoked, translate the one of the secure calls into a call specific to an architecture of the server computing device (e.g., a vendor-specific or OEM-specific call). The network computing device may perform the call, which may include sending a signal to the server computing device in a format interpretable by the server computing device.

In some embodiments, the network computing device is a data processing unit that implements a reduced instruction set computer (RISC) architecture in one or more embedded processors. However, in other embodiments, instead of a data processing unit, a field programmable gate array (FPGA) card or other like computing device may be employed that is capable of running a DPU operating system or other like type of operating system.

In various embodiments, the server computing device may include a baseboard management controller. As such, the secure call made by a DPU OS to a DPU-trusted firmware may be translated in a vendor-specific proprietary manner to call or communicate with the baseboard management controller of the server computing device. In various embodiments, the secure calls made by a DPU OS may be translated in a vendor-specific proprietary manner to call or communication with the server firmware component of the server device. In various embodiments, the secure call made by a DPU OS to the DPU-trusted firmware abstracts functionality wholly implemented by the DPU hardware or firmware components. In various embodiments, the calls made by a DPU OS to DPU-trusted firmware abstract the integration of such a DPU OS with the combined server and DPU solution, thereby abstracting differences between various DPUs or differences between various servers. Such firmware abstraction mechanism includes not only calls made by a DPU OS, but also how notifications (e.g. power off requests, crash requests, and so forth) are abstracted and delivered to a DPU OS by the DPU firmware in a common manner.

In some examples, the signal sent to the server computing device may include a fatal peripheral component interconnect express (PCIe) error interrupt that notifies an operating system of the server computing device about fatal errors in the DPU OS or DPU components that lead to compromising functionality presented by the DPU to the server computing device. In additional examples, the signal sent to the server computing device may be a power-on self-test code or DPU operating system service status sent to the baseboard management controller of the server computing device. In other examples, a power off signal sent by a server computing device (e.g., OS, BMC, or other component thereof) may be abstracted and communicated as an advanced configuration and power interface (ACPI) power button device event delivered to the DPU OS. In further examples, the signal sent to the service computing device may include a baseboard management controller crash request.

Turning now to FIG. 1, an example of a networked environment 100 is shown. The networked environment 100 may include a computing environment 103, client devices 106, and various computing systems 109 in communication with one other over a network 112. The network 112 may include, for example, the Internet, intranets, extranets, wide area networks (WANs), local area networks (LANs), wired networks, wireless networks, other suitable networks, or any combination of two or more such networks.

The network 112 of the networked environment 100 may include satellite networks, cable networks, Ethernet networks, telephony networks, and other types of networks. The computing systems 109 may include devices installed in racks 115a . . . 115n (collectively "racks 115"), which can make up a server bank, aggregate computing system, or a computer bank in a data center or other like facility. In some examples, the computing systems 109 may include high-availability computing systems, which includes a group of computing devices that acts as a single system and provides a continuous uptime. The devices in the computing systems 109 may include any number of physical machines, virtual machines, virtual appliances, and software associated therewith, such as operating systems, drivers, hypervisors, DPU OSs, scripts, applications, and so on.

The computing systems 109, and the various hardware and software components contained therein, may include infrastructure of the networked environment 100 that provide one or more computing services 118. Computing services 118 may include network-based application programming interface (API) services that can be invoked through a network-based API call, for example.

The computing environment 103 may include an enterprise computing environment that includes hundreds or even thousands of physical machines, virtual machines, virtual appliances, and other software implemented in devices stored in racks 115, distributed geographically, and connected to one another through the network 112. As such, the computing environment 103 can be referred to as a distributed computing environment in some examples. It is understood that any virtual machine or virtual appliance is implemented using at least one physical device, such as a server or other computing device.

The devices in the racks 115 may include various physical computing resources. The physical computing resources may include, for example, physical computing hardware, such as memory and storage devices, servers 121a . . . 121n (collectively "servers 121"), switches 124a . . . 124n, GPUs 130a . . . 130n, DPUs 133a . . . 133n (collectively "DPUs 133"), central processing units (CPUs), power supplies, and so forth. The devices, such as servers 121, switches 124, GPUs 130, DPUs 133, and the like, can have dimensions suitable for quick installation in slots 136a . . . 136n (collectively "slots 136") on the racks 115.

In various examples, the servers 121 may include physical hardware and software to create and manage virtualization infrastructure, a cloud computing environment, an on-premise environment, and/or a serverless computing environment. Also, in some examples, the physical computing resources may be used to provide virtual computing resources, such as virtual machines or other software, as a computing service 118. In various examples, the virtual machines may serve up virtual desktops or other virtualized computing infrastructure.

Each server 121 in the networked environment 100 and, thereby, may include one or more virtual machines (VMs) executing thereon. Referring to representative DPU 133, the DPUs 133 may include accelerators 139 that offload tasks from CPUs of the servers 121, such as those that manage distributed and virtualization applications. The accelerators 139 may perform networking and storage tasks more efficiently than CPUs of the servers 121, as may be appreciated. In some implementations, the DPUs 133 include CPUs and memory 142 such that the operation of the accelerators 139 is configurable by developers and/or administrators (e.g., through programming and execution of particular applications or other processes).

In some examples, the DPU OS 145 is an operating system that can be installed on one or more DPUs 133, and a hypervisor 202 can be installed on servers 121 to support a virtual machine execution space within which one or more virtual machines can be concurrently instantiated and executed with networking and storage virtualization offloaded to the DPU and DPU OS. The DPU OS 145 may include the ESXio™ hypervisor by VMware®, or similar hypervisor in some examples. Likewise, the server hypervisor 202 may include the ESXi™ hypervisor by VMware® or similar hypervisor. In these embodiments, the DPU OS (I/O hypervisor) and server OS (compute hypervisor) work in tandem without any trust or isolation boundary, and the DPU OS 145 is effectively managed by the server hypervisor.

In some examples, the DPU OS 145 is installed on one or more DPUs 133 with an arbitrary customer-chosen operating system or hypervisor installed on the server 121, including Linux™, Windows™, Hyper-V™, Xen™, ESXi™, and so forth. In these embodiments, the DPU 133 and DPU OS 144 offload I/O functions to the server OS without specific integration with the server's virtualization environment, if any. Accordingly, a clear isolation and trust boundary exists between the server 121 and DPU OS 145 that, while impacting some of the possible functionality made available, is particularly advantageous in a cloud service provider (CSP)-like environment, where the server OS and the underlying infrastructure (including networking, storage, and DPUs 133) are managed by different organizational units, legal entities and the like. In some embodiments, the DPU OS 145 is managed separately from the server hypervisor. This is also known as support for bare metal compute, where even non-virtualized server workloads can make use of virtualized networking and storage provided by the DPU 133.

It is understood that the computing systems 109 can be scalable, meaning that the computing systems 109 in the networked environment 100 can increase or decrease dynamically to include or remove servers 121, switches 124, GPUs 130, DPUs 133, power sources, and other components without downtime or otherwise impairing performance of the computing services 118 offered up by the computing systems 109.

Referring now to the computing environment 103, the computing environment 103 may include, for example, a server 121 or any other system providing computing capability. Alternatively, the computing environment 103 may include one or more computing devices that are arranged, for example, in one or more server banks, computer banks, computing clusters, or other arrangements. The computing environment 103 may include a grid computing resource or any other distributed computing arrangement. The computing devices can be located in a single installation or can be distributed among many different geographical locations. The computing environment 103 may include or be operated as one or more virtualized computer instances in some examples. Although shown separately from the computing systems 109, it is understood that in some examples the computing environment 103 can be included as all of or a part of the computing systems 109.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 109 and client devices 106 over the network 112, sometimes remotely, the computing environment 103 can be described as a remote computing environment 103 in some examples. Additionally, in various examples, the computing environment 103 can be implemented in servers 121 of a rack 115, and can manage operations of a virtualized or cloud computing environment through interaction with the computing services 118.

The computing environment 103 may include a data store 150, which may include one or more databases in some examples. The data store 150 may include memory of the computing environment 103, mass storage resources of the computing environment 103, or any other storage resources on which data can be stored by the computing environment 103. The data store 150 may include memory of the servers 121 in some examples. The data store 150 may include one or more relational databases, such as structured query language databases, non-SQL databases, or other relational or non-relational databases. The data stored in the data store 150, for example, can be associated with the operation of the various services or functional entities described below. The components executed on the computing environment 103 may include, for example, virtualization service 153, network services 156, as well as other applications, services, processes, systems, engines, or functionality not discussed in detail herein.

Ultimately, the various physical and virtual components of the computing systems 109 can process workloads 180a . . . 180n. Workloads 180 can refer to the amount of processing that a server 121, switch 124, GPU 130, DPU 133, or other physical or virtual component has been instructed to process or route at a given time. The workloads 180 can be associated with execution of virtual machines, public cloud services, private cloud services, hybrid cloud services, virtualization services, device management services, containers, or other software executing on the servers 121 (and thus, in the computing environment 103).

Referring back to representative DPU 133a, the DPU 133a (or other computing device) may include a hardware-implemented watchdog 159. The hardware-implemented watchdog 159 may include a watchdog that is configured in a physical circuit, an application-specific integrated circuit (ASIC), or computing system to send a reset signal when a predetermined amount of time elapses without receipt of a refresh signal. For instance, a timer will increment downwards until a predetermined amount of time has expired. If a refresh signal is not received before expiration of the predetermined amount of time, the hardware-implemented watchdog 159 sends the reset signal. The reset signal may direct the device to enter into a safe mode of operation, perform a system reset, recycle, or reboot the device, or similar operation, as may be appreciated. The hardware-implemented watchdog 159 may be contrasted with a software-implemented watchdog that requires software to refresh and/or send reset signals, as may be appreciated, which requires use of the CPU.

The firmware 148 may further include a runtime watchdog service 162. It may be desirable to have a single image of an operating system (e.g., a DPU OS 145) that can be installed and operate on a device regardless of a type, model, manufacturer, specifications, etc., of the device. For instance, a same image of the DPU OS 145 that can execute as intended on a certain model of DPU 133 manufactured by DeltaCo, a generic example of a first OEM, may also be used to execute as intended on a varying model of DPU 133 manufactured by BetaCo, a generic example of a second OEM. It is understood that the servers 121, DPUs 133, and the like may have varying models, manufacturers, specifications, and so forth, whereas existing systems require consistent types of devices.

Further, for performing boot operations in association with a DPU OS 145, it may be desirable that the hardware-implemented watchdog 159 is capable of handling long periods without sending reset signals. In other words, it is not desirable for the hardware-implemented watchdog 159 to send resent signals while the DPU OS 145 is being booted or otherwise brought online. As such, it can be desirable to have a hardware-implemented watchdog 159 that is capable of idling for a predetermined amount of time (e.g., approximately five minutes as but one example) without sending a reset signal. For example, ARM® Base System Architecture (BSA) compliant watchdogs have a 48-bit watchdog offset register (WOR), which is sufficient for allowing the hardware-implemented watchdog 159 to idle for approximately five minutes. It is further desirable that the hardware-implemented watchdog 159 be capable of performing a "bite" operation that causes a system reset.

If the hardware-implemented watchdog 159 is not capable of idling for the predetermined time and/or performing the bite operation, then functionality of a suitable watchdog may be paravirtualized via a DPU firmware-implemented runtime watchdog service 162. In other words, the DPU 133 may be configured to handle greater idling times and perform other operations as needed to boot a DPU OS 145.

In some embodiments, the runtime watchdog service 162 may use the same units as a generic timer (e.g., driven by CNTFRQ_EL0) and may have the same constraints as the BSA generic watchdog. While implementations leveraging only the secure timer is possible, other implementations include using and refreshing the hardware-implemented watchdog 159 to avoid system resets during a boot of a DPU OS 145, for example. Through operations of the runtime watchdog service 162, the device will be able to recover from situations where all processing cores are crashed due to programmatic error or external event, and exceptions are unable to be handled.

Figure 2A:
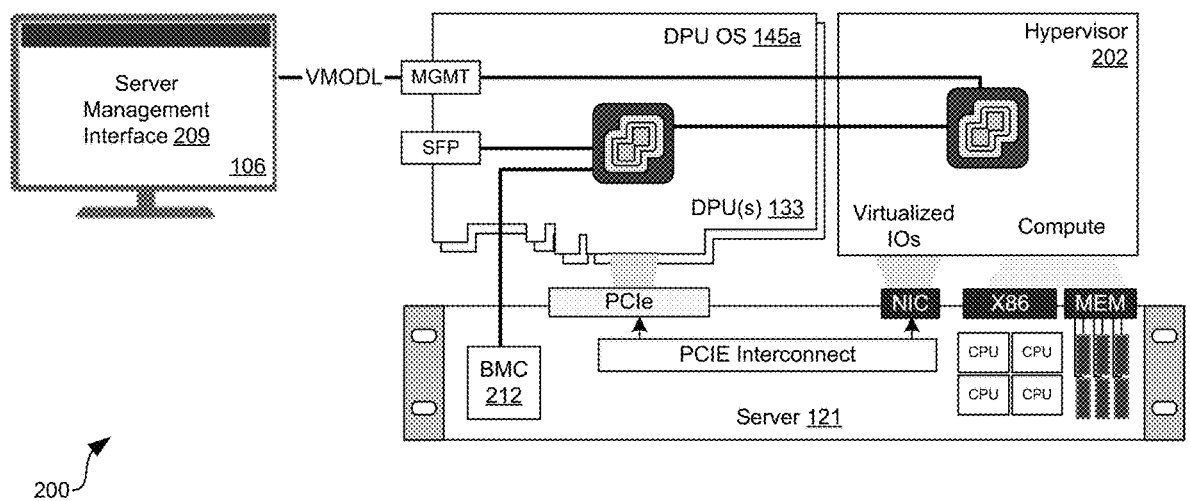
FIGS. 2A-2B are architectural diagrams illustrating a DPU having a DPU operating system executing thereon, and a server having a hypervisor or other operating system (e.g., a bare-metal operating system) executing thereon.
Figure 2B:
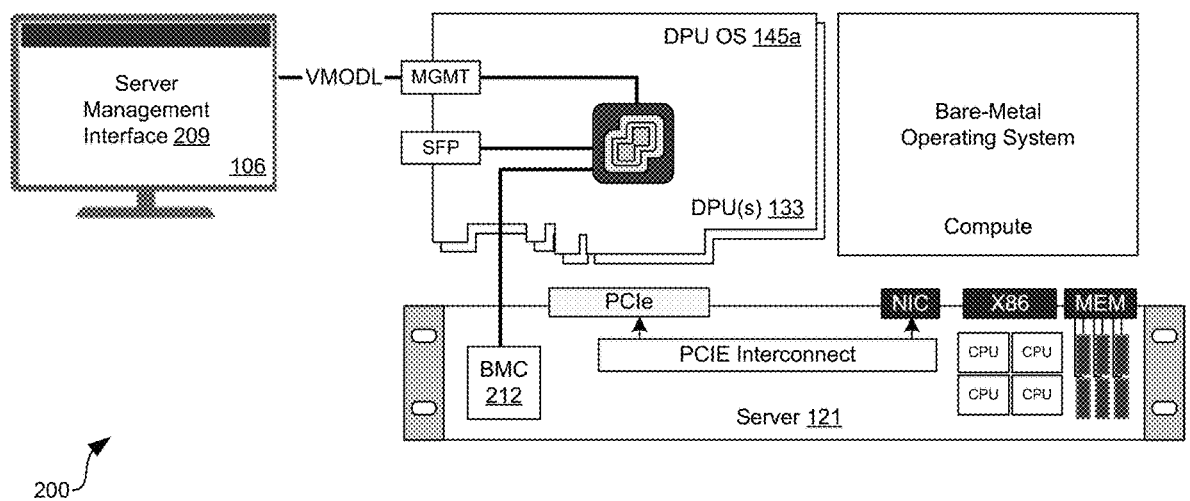

Turning now to FIGS. 2A and 2B, examples of an architectural diagram 200 is shown that may include the components of the networked environment 100 of FIG. 1. For instance, the architectural diagram 200 includes a DPU OS 145a installed and executing on a DPU 133 (or like computing device), a hypervisor 202 installed and executing on a server 121. A client device 106 may execute a server management interface 209 to direct execution of virtualization services in some examples.

The hypervisor 202 may manage the DPU 133 through interaction with the DPU OS 145a as a standard PCIe peripheral. A baseboard management controller 212 of the server 121 may be a source of platform management, as may be appreciated. In some embodiments, communication with the baseboard management controller 212 may be performed by providing dedicated control and status channels between the DPU 133 and the baseboard management controller 212. For instance, a high-bandwidth network connection may be provided for communication using a communication protocol, such as Redfish, that employs a RESTful interface for the management of networking, storage, servers, and converged infrastructure. Further, a low-bandwidth control channel interface (e.g., a network controller sideband interface (NC-SI)) may be provided for communication.

Now, communication between the DPU OS 145 and the baseboard management controller 212 and/or server 121 is described. In some embodiments, the DPU OS 145 communicates with the baseboard management controller 212 via the Redfish communication protocol, although other suitable communication protocols may be employed. In some embodiments, the DPU OS 145 uses the baseboard management controller 212 of the server 121 for lifecycle operations of the DPU 133. To this end, the DPU OS 145 may communicate with the baseboard management controller 212 of the server 121 for hypervisor-related provisioning purposes and configuration (e.g., imaging), hypervisor-related control operations (e.g., reboot and power-off handling), collecting troubleshooting information, and so forth.

In some embodiments, the baseboard management controller 212 of the server 121 may provide a LAN-based channel to allow management from the hypervisor 202. The management LAN may be encrypted or otherwise protected. For instance, in some embodiments, communication between the hypervisor 202 and the baseboard management controller 212 of the server 121 must be authenticated. Further, the baseboard management controller 212 may be resilient to external attacks, such as denial-of-service (DoS) attacks. The components that interact with the hypervisor 202 (e.g., Redfish) may be able to interoperate with a hypervisor 202 that only uses Federal Information Processing Standard (FIPS) validated cryptography. The server 121 may use approved cryptography (or lack thereof), but may not require the hypervisor 202 to use unapproved cryptography. A management protocol may be implemented using Redfish or similar communication protocol.

In some embodiments, to facilitate discovery operations, the baseboard management controller 212 of the server 121 may provide the following information for a supported DPU 133: slot information (e.g., a physical location of a DPU 133 within a server 121); bus identification information (e.g., a programmatic location of a function part of the DPU 133, i.e. segment, bus, device and function information for PCIe-like systems), which may be used to perform hardware compatibility list (HCL) validation and used to off-line the DPU 133 via OS-triggered deferred procedure calls (DPCs); and UUID information (e.g., a vendor-unique identifier for consistent identification of a DPU 133 in a DPU OS 145a, hypervisor 202, baseboard management controller 212, and data center/clustering management).

Functions performed by the server 121 described herein can be executed or otherwise performed by a server hypervisor or a bare-metal workload. The hypervisor 202 may be a proprietary hypervisor as described above. As such, functionality is afforded by avoiding a trust boundary between the server hypervisor and the DPU 133 (or other I/O software on the DPU 133).

In a bare metal compute situation, as shown in FIG. 2B and described above, a trust boundary, however, exists between the DPU 133 and the server operating system, which may be useful in approaches where the server 121 and the workloads 180 are managed by different entities (such as the case in cloud computing environments). The reduced and different integration between the DPU 133 and server operating system management allows an arbitrary server operating system environment to be supported, such as Linux™ OS, Windows™ OS or virtualized environments including KVM™, HyperV™, Xen™, or solutions by VMware®.

Figure 3:
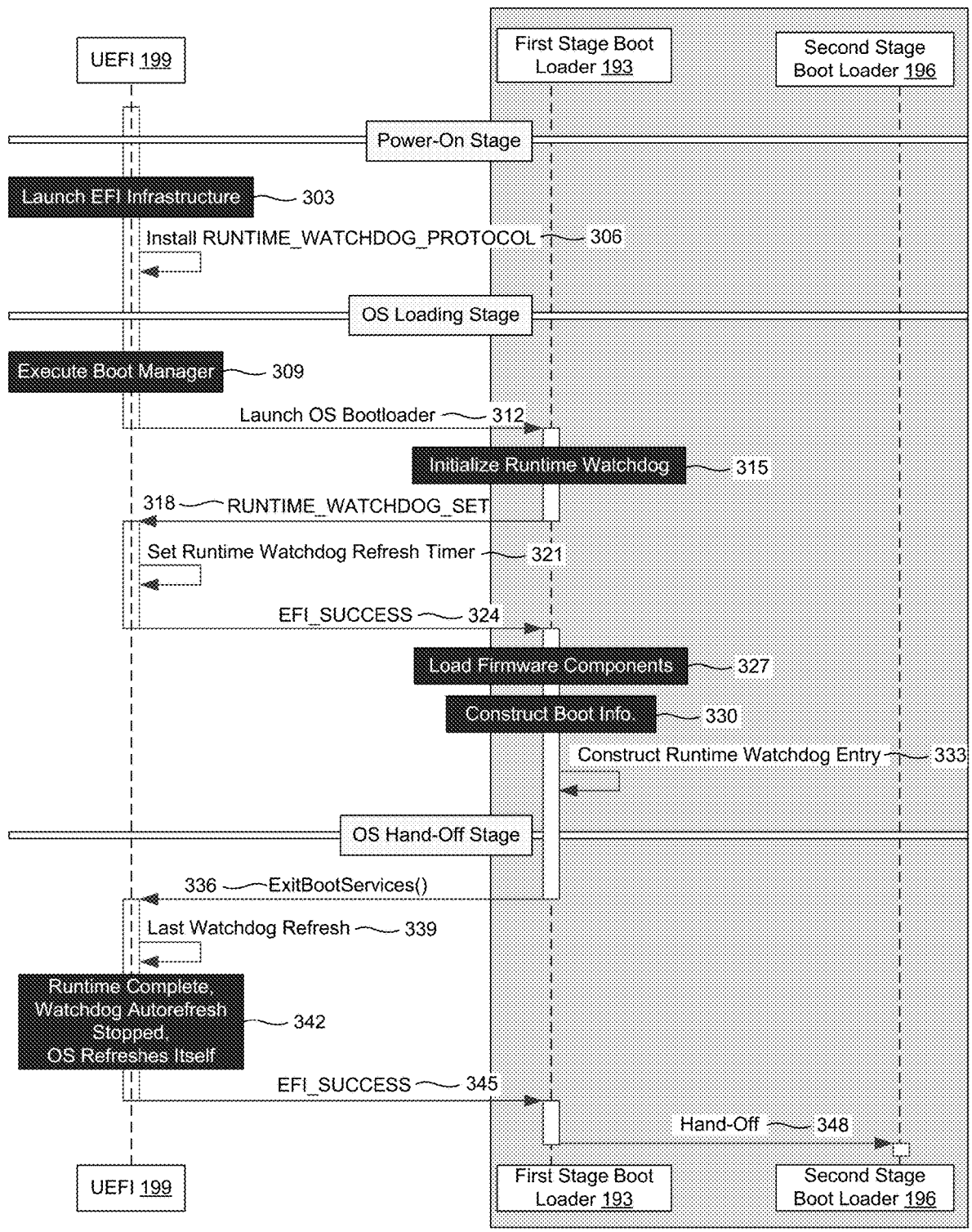
FIG. 3 is a sequence diagram illustrating a boot operation in which an application programming interface is employed to control operation of an underlying hardware-implemented watchdog.

Referring now to FIG. 3, a non-limiting example of a sequence diagram is shown according to various embodiments. The various stages of the sequence diagram may be performed during a booting process, which may include a process in which operating system components are loaded into random-access memory or other desired memory. Initially, a DPU 133 or other device may include firmware 148 having UEFI or BIOS firmware that oversees boot operations. As such, the sequence diagram may be performed in a boot loading environment, such as a UEFI boot loading environment, by applications executing in the boot loading environment.

First, at box 303, during a power-on stage (e.g., a stage immediately following a physical powering on of a device, such as a DPU 133 or a server 121), the UEFI boot loader 199 on the device may launch EFI Infrastructure (e.g., executing software) that permits EFI-compliant executables to be executed. The EFI infrastructure may permit applications, such as the first stage boot loader 193 to execute, e.g. to boot the DPU OS. This interface, RUNTIME_WATCHDOG_PROTOCOL, provides an easy way to not only query available facilities and/or specifications of any hardware-implemented watchdogs 159 on a device, but also to activate a hardware-implemented watchdog 159 in the first stage boot loader 193 and leave the hardware-implemented watchdog 159 armed after ExitBootServices( ) is invoked (e.g., UEFI to operating system hand-off). Additionally, the application programming interface may not just be used to activate the hardware-implemented watchdog 159, but also handle any required periodic updates of the hardware-implemented watchdog 159, removing such engineering requirements from the first stage boot loader 193.

At box 306, the UEFI system may install a runtime watchdog protocol during the power-on stage, for example. The runtime watchdog protocol may include an application programming interface that can be invoked to initialize a runtime watchdog service that oversees the hardware-implemented watchdog 159, as will be described. In some embodiments, the runtime watchdog protocol (e.g., the application programming interface) is installed by storing a driver in a directory that directs the UEFI boot loading environment to install the driver during the power-on stage of the booting process.

The runtime watchdog protocol may include an application programming interface in which an API call causes at least one of the following to be performed: enable the hardware-implemented watchdog; disable the hardware-implemented watchdog; access a type of the hardware-implemented watchdog; access a physical memory address for the hardware-implemented watchdog; identify a minimum countdown period in which the hardware-implemented watchdog is capable of being configured; and identify a maximum countdown period in which the hardware-implemented watchdog is capable of being configured.

Thereafter, the process proceeds to the operating system loading stage. There, at box 309, the UEFI system may execute a boot manager configured to handle and oversee the booting process. At box 312, the boot manager launches an operating system boot loader, which includes executable code that initializes and launches an operating system. At box 315, the first stage boot loader 193 may initialize the runtime watchdog service 162. Initializing the runtime watchdog service 162 may include invoking a runtime watchdog protocol function using input parameters. Additionally, initializing the runtime watchdog service 162 may include enabled the hardware-implemented watchdog 159.

Thereafter, at boxes 318 and 321, the first stage boot loader 193 may set a runtime watchdog refresh timer, for instance, by invoking a RUNTIME_WATCHDOG_SET function of the runtime watchdog protocol ("RUNTIME_ WATCHDOG_PROTOCOL"). The UEFI system, at box 324, may respond by returning a success signal ("EFI_SUCCESS") to the first stage boot loader 193, for instance, if the watchdog refresh timer is successfully set on the hardware-implemented watchdog 159.

At box 327, the first stage boot loader 193 may load DPU OS 145 components used to execute the DPU OS 145. In other words, the first stage boot loader 193 may load or store operating system components in random-access memory or other memory. At box 330, the first stage boot loader 193 may construct boot information data, which may include a table, data object, or other collection of data. At box 333, the first stage boot loader 193 may construct a runtime watchdog entry for a table, database, or other suitable memory location.

Thereafter, the process proceeds to the operating system hand-off stage. At box 336, the ExitBootServices( ) function is invoked after a predetermined set of boot operations have completed. Next, at box 339, the UEFI boot loader 199 (e.g., at the direction of the first stage boot loader 193) may perform a last watchdog refresh to prevent the hardware-implemented watchdog 159 from lapsing during a hand-off from the UEFI system to the operating system. At box 342, the runtime of the UEFI system is complete, and the UEFI system will no longer refresh the watchdog. As such, at box 345, the UEFI system will send an EFI success signal to the first stage boot loader 193, who then hands-off operation of the hardware-implemented watchdog 159 to a kernel of the operating system at box 348. Thereafter, the process can proceed to completion.

Notably, a UEFI (or similar) protocol is described for arming the hardware-implemented watchdog 159. In some embodiments, by default, the hardware-implemented watchdog 159 is not enabled and will be activated by the UEFI boot loader 199. When activated, the UEFI boot loader 199 may be responsible for refreshing the hardware-implemented watchdog 159 until ExitBootServices( ) is invoked (e.g., where UEFI is handed off to the operating system). In instances in which hardware allows, the hardware-implemented watchdog 159 may be deactivated by the UEFI boot loader 199 if booting aborts and execution is passed back to the UEFI boot device selection (BDS).

In some embodiments, when on ExitBootServices( ) is invoked, the hardware-implemented watchdog 159 may be left armed. The UEFI boot loader 199 may perform one last watchdog refresh to ensure that the operating system is not handed control at the tail end of the refresh period. In some embodiments, the operating system may then become responsible for refreshing. In an event, the operating system halts or crashes, the operating system may be responsible for refreshing the watchdog, if necessary, to avoid a hard reset (e.g., a physical repowering of the device). A boot loader (e.g., a DPU OS boot loader) may use RUNTIME_WATCHDOG_SET to set a watchdog period long enough to cover a boot of a DPU OS 145 or other software (e.g., 5 minutes). In the future, a boot loader may instead opt for a short period, as the protocol definition includes auto-refresh to make it convenient to use in a UEFI environment.

Figure 4:
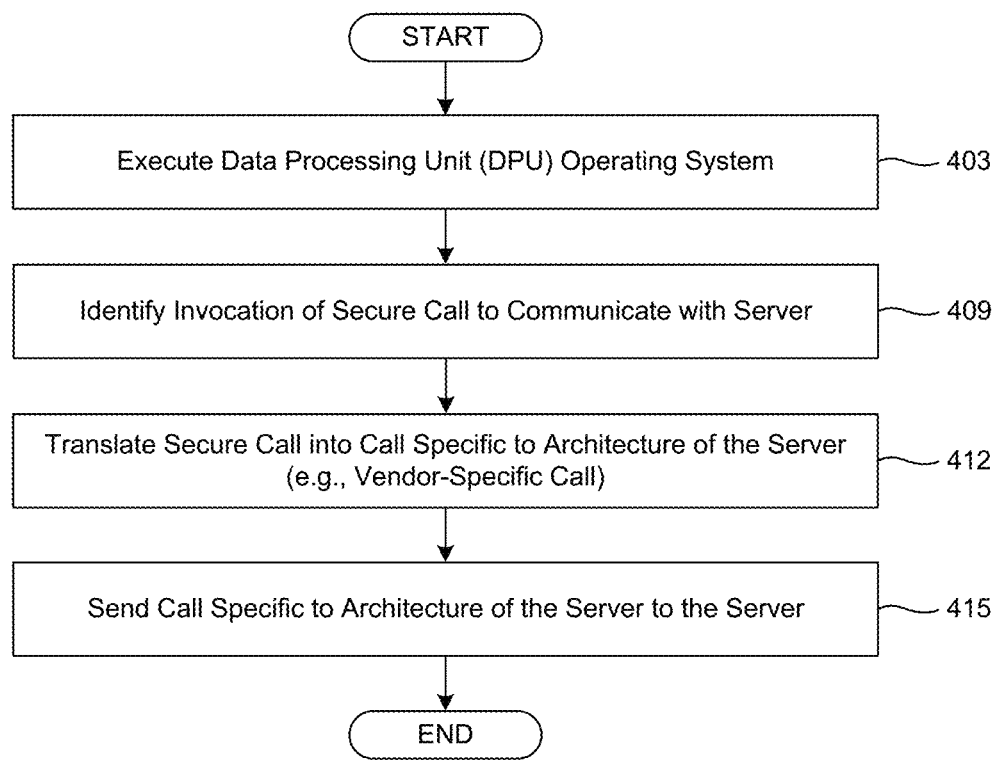
FIG. 4 is a flowchart illustrating functionality implemented by components of a DPU or other computing device of the solution environment of FIG. 1.

Moving on to FIG. 4, a flowchart is shown that provides one example of the operation of a portion of the networked environment 100. The flowchart of FIG. 4 can be viewed as depicting an example of elements of a method implemented by the DPU OS 145 executing in the DPU 133 or other computing device according to one or more examples. The separation or segmentation of functionality as discussed herein is presented for illustrative purposes only.

As noted above, it is ideal to provide combined server and DPU solutions having servers 121 and DPUs 133 where those computing devices are made and sold by varying vendors, different OEMs, and so forth. For instance, it can be restrictive to have a solution that only employs a particular type of DPU 133 and a specific type of server 121. By offering the ability to use differing types of servers 121, DPUs 133, and the like, the way a DPU 133 or other device communicates with a baseboard management controller 212 of a server 121 (or server firmware) may differ. Yet, it is ideal to have a single DPU OS 145 operating system image that can be installed and executed on varying types and architectures of network devices (e.g., DPUs 133 or the like) while maintaining identical code paths as much as possible.

Some areas where adaptations differ among varying types of network devices include low-level signaling from the DPU OS 145 (e.g., faults, service status, diagnostic status) to a platform (e.g., baseboard management controller 212 and/or server firmware); high-level protocol signaling from the DPU OS 145 to the baseboard management controller 212; and platform (e.g., the baseboard management controller 212 and server firmware) signaling to the DPU OS 145 (e.g., shutdown operations, NMIs, and the like).

Accordingly, various embodiments described herein relate to abstracting low-level signaling using a trusted firmware interface with a set of secure monitor calls that abstract and hide DPU hardware specific and OEM-specific calls and operations. As such, a DPU 133 firmware abstraction interface (e.g., secure monitor calls and other calls) may provided by DPU firmware (e.g., trusted firmware, UEFI, and ACPI) for the benefit of the DPU OS 145 or other I/O hypervisor. The firmware abstraction, as such, may use a same DPU OS 145 image on differing combinations of server 121 and DPU 133 vendors without requiring a unique build of the DPU OS 145 for each combination (e.g., Dell™ and NVIDIA™, Dell™ and Pensando™, Dell™ and Intel™, HPE™ and Dell™, Lenovo™ and Dell™, and so forth). In some implementations, multiple types of DPUs 133 are not present. In other words, the make, model, and/or manufacturer of the DPUs 133 in some solutions may be the same, whereas the make, model, and/or manufacturer of the server 121 and/or DPU 133 may be different.

Beginning with box 403, the DPU 133 may execute a DPU OS 145 or other type of operating system. The DPU OS 145 may be executed on the DPU 133 to provide increased access to and control of underlying hardware resources for virtualization-related services or other network-related services. The DPU OS 145 may invoke a number of secure calls (e.g., SMCs) that abstract certain DPU or SmartNIC mechanisms and integrations within the larger combined server and DPU solution. These SMCs are exercised by the DPU OS 145 kernel and user (e.g., applications, services, engines, scripts, and the like) components executing thereon. As such, a DPU OS 145 component or other software executing on a first DPU 133 having a first vendor-specific architecture (requiring vendor-specific calls) will execute as intended on the first DPU 133 and the same application executing on a second DPU 133 having a second vendor-specific architecture different than the first vendor-specific architecture (also requiring vendor-specific calls) will execute as intended on the second DPU 133 despite differences in the architectures. The SMCs comprising this DPU firmware interface for a DPU OS 145 may be implemented as part of trusted firmware on the DPU 133, a low-level component crucial for booting a DPU OS 145, and executing a privilege level higher than the DPU OS 145 itself.

Next, at box 406, the DPU 133 may identify an invocation of one of the secure calls made on the DPU 133 to communicate with the server 121. Communication with the server 121 may include communication with the baseboard management controller 212 of the server 121, the firmware of the server 121, the operating system of the server 121, and the like. It is understood that the server 121 may be one of a multitude of servers 121 in the networked environment 100, where each server 121 may be one of a multitude of differing types, models, and made and sold by varying vendors, different OEMs, and so forth.

As such, in box 412, in an instance in which one of the secure calls is invoked, the trusted firmware on the DPU 133 may translate the secure call invoked into a call specific to an architecture of the server 121 (e.g., a vendor-specific or OEM-specific call). Accordingly, high-level signaling, low-level signaling, and the like may be abstracted into a sample secure call which may be the same across images of the DPU OS 145 deployed on varying types and models of network devices.

In some embodiments, low-level signaling between the DPU 133 and the server 121 may be abstracted using a trusted firmware interface with a set of secure monitor calls (SMCs) for implementations utilizing ARM® or RISC architecture. The abstraction of the low-level signals may hide the DPU 133 hardware-specific and OEM-specific operations.

In one example, a SignalFatalError call may be provided to signal a fatal PCIe error on every endpoint visible to the OS or hypervisor running on the server 121. The error may be containable or ignorable by the server 121 as required in some implementations, such as (e.g., enhanced downstream port containment (eDPC) implementations, AER implementations). Unlike passive state reporting by the SignalServiceStatus call, which may be primarily intended for platform firmware and boot integration, the SignaFatalError may result in an error interrupt delivered to an operating system of a server 121. This call may be used by the DPU OS 145, for example to notify the server 121 as a part of system crash and/or panic handling. Further, the call may also be used by firmware 148 of the DPU 133 on unexpected CPU resets (e.g., thermal-related, power-related, or watchdog-related resets), such that the server 121 is signaled before operation of the DPU 133 halts.

In another example, a PostUpdate call may be provided to report a power-on self-test (POST) code or a DPU operating system service status to the baseboard management controller 212 of the server 121. The power-on self-test code or the DPU operating system service status may be intended to be delivered to the baseboard management controller 212 of the server 121 (e.g., either being pushed to the baseboard management controller 212 or polled by the baseboard management controller 212). In some embodiments, there may be no requirement that the baseboard management controller 212 must ever see a power-on self-test code transition or change. However, the baseboard management controller 212 may always be able to identify a last-known power-on self-test code.

Further, a PostUpdate OEM service call may be used by multiple components to passively provide short informational status updates for debugging and OEM server-specific purposes (e.g., as boot progression through different layers of firmware, boot logic and DPU OS 145 software). The interface may be implemented in terms of vendor-specific functionality, e.g., SMBUS traffic, registers visible over PCIe config space from the server 121, custom interfaces, a RAM-based log, etc. postcode_t may be a 32-bit value, with a 4-bit owning entity number used to split the value space into network service provider and vendor-specific ranges.

In further examples, a SignalServiceStatus call may be provided to perform a platform-specific action based on a state of the DPU OS 145. Some DPU OS 145 based solutions may require additional DPU 133 or server 121 OEM-specific steps, e.g., resulting from the DPU OS 145 fully coming up, entering a crash handler, and so forth). For example, certain server-visible PCIe config space registers for functions exposed to the DPU 133 may take on special values, or the firmware may choose to report special status codes. The SignalServiceStatus OEM call may be employed for such actions. For instance, the SignalServiceStatus call may be employed for passively reporting an operational status of the DPU OS 145, primarily to server platform firmware as part of boot integration.

In some embodiments, high-level protocol signaling may be performed from the DPU OS 145 to the baseboard management controller 212, which may rely on a dedicated TCP/IP connection existing between the DPU OS 145 and the baseboard management controller 212 over an NC-SI connection. In some implementations, the high-level protocol is the Redfish communication protocol. While the actual details of the command set may differ, the operations are common and the differences can be abstracted in software using, for example, a BMCAL layer (e.g., updating status for a DPU OS provisioning operation, reporting logs, reporting high-level service statuses, and so forth). For some solutions reporting full operations, the communication may be performed via Redfish, while error states are reported using low-level signaling described above.

In further embodiments, platform signaling may be provided from the server 121 platform to the DPU OS 145. In some examples, power state notifications via may be abstracted for regular ACPI power button notifications. While the actual mechanism used by the baseboard management controller 131 is server 121 OEM-specific and DPU 133 vendor specific (e.g., NC-SI, GPIO, SMBUS writes, etc.), a power off request may be delivered as an ACPI Power Button Device (PNP0C0C) event.

Further, baseboard management controller 212 crash requests ("NMI") may be abstracted. While an actual mechanism used by a baseboard management controller 212 is server 121 OEM and DPU 133 vendor specific (e.g., NC-SI, GPIO, SMBUS writes, etc.), a crash dump request may be treated as a RAS event, e.g., as a custom non-maskable SError Interrupt (SEI) to EL2, with further guidance for the current set of Cortex-A72 based DPUs 133. To this end, the SEI may be signaled regardless of exception masking state (PSTATE.A) as the NMI SEI may not be maskable.

Finally, in box 415, the DPU 133 may perform the call translated in box 412. Performing the call may include, for example, sending a signal to the server 121 from the DPU 133 in a format interpretable by the server 121. For instance, the actual call sent form the DPU 133 to the server 121 may be in a vendor-specific or OEM-specific format, whereas the secure call identified as being made in box 409 is a secure call from the DPU OS to the DPU trusted firmware.

As such, in some examples, a secure call made in box 409 may be translated into the call specific to the architecture of a first server 121a, for example, by identifying the architecture of the first server 121a; identifying a function (e.g., a vendor-specific or OEM-specific function) to invoke based on the architecture of the first server 121a; and executing the function in response to the secure call being invoked.

In contrast, if the same call were invoked for a second server of a differing make or manufacturer, in some examples, a secure call made in box 409 may be translated into the call specific to the architecture of a second server 121b, for example, by identifying the architecture of the second server 121b; identifying a function (e.g., a vendor-specific or OEM-specific function) to invoke based on the architecture of the second server 121b; and executing the function in response to the secure call being invoked. Thereafter, the process may proceed to completion.

The various operations described above with respect to FIG. 4 may be performed by a computing device through execution of program instructions. The program instructions may be a portion of firmware 148 stored in non-volatile memory, such as memory 142 of a DPU 133 or other computing device. While many of the examples described herein relate to a DPU OS 145 executing on a DPU 133, it is understood that the DPU 133 may instead be a similar kind of device on which an I/O OS or hypervisor may run, such as a computational storage device or GPU.

Stored in the memory device are both data and several components that are executable by the processor. Also stored in the memory can be a data store 150, firmware 148, and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, RAM, ROM, hard drive, solid-state drive, USB flash drive, memory card, optical disc such as compact disc (CD) or digital versatile disc (DVD), floppy disk, magnetic tape, or other memory components.

Memory may include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface may include additional systems designed to coordinate this communication, including, for example, performing load balancing. The processor can be electric or of some other available construction.

Client devices 106 may be used to access user interfaces generated to configure or otherwise interact with the computing environment 103. These client devices 106 may include a display upon which a user interface generated by a client application for providing a virtual desktop session (or other session) can be rendered. In some examples, the user interface can be generated using user interface data provided by the computing environment 103. The client device 106 can also include one or more input/output devices that may include, for example, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies may include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that may include program instructions to implement the specified logical function(s). The program instructions can be embodied in the form of source code that may include human-readable statements written in a programming language or machine code that may include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic may include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium may include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for data processing unit (DPU) operating system integration in a combined server and DPU solution, comprising:
   a server computing device and a data processing unit communicatively coupled to one another, and each comprising at least one hardware processor; and
   program instructions stored in memory that, when executed by the at least one hardware processor of the DPU, direct DPU to:
      execute a DPU operating system on the DPU, wherein the DPU operating system exercises a plurality of secure calls implemented by a DPU trusted firmware component, implemented by DPU trusted firmware to be invoked by components of the DPU operating system;
      identify an invocation of one of the secure calls made on the DPU to communicate with the server computing device or perform another function associated with the DPU; and
      in an instance in which the one of the secure calls is invoked, translate the one of the secure calls into a call or request specific to an architecture of the server computing device and perform the call, wherein the call being performed comprises sending a signal to the server computing device in a format interpretable by the server computing device; wherein
      the DPU implements a reduced instruction set computer (RISC) architecture capable of executing the DPU operating system;
      the server computing device comprises a baseboard management controller (BMC); and
      the one of the secure calls made to the DPU is a secure monitor call (SMC) translated to a request to the baseboard management controller of the server computing device, the secure monitor call being a call compliant with the RISC architecture.

2. The system of claim 1, wherein the signal sent to the server computing device is a fatal peripheral component interconnect express (PCIe) error interrupt that directs an operating system of the server computing device to notify endpoints visible to the operating system of the server computing device.

3. The system of claim 1, wherein the signal sent to the server computing device is a power-on self-test code sent to the baseboard management controller of the server computing device.

4. The system of claim 1, wherein the signal sent to the server computing device is a DPU operating system status signal sent to the baseboard management controller of the server computing device.

5. The system of claim 1, wherein the signal sent to the server computing device is a DPU halt request communicated as an advanced configuration and power interface (ACPI) power button device event.

6. The system of claim 1, wherein the signal sent to the server computing device is a DPU crash request from the baseboard management controller.

7. The system of claim 1, wherein:
   the DPU is a first computing device;
   the server system further comprises a second computing device;
   the one of the secure calls from the DPU operating system is translated into the call specific to the architecture of the first computing device by: identifying the architecture of the first server computing device; identifying a function to invoke based on the architecture of the first server computing device; and executing the function in response to the secure call being invoked; and the at least one hardware processor of the DPU is further directed to identify the architecture of the second computing device; identify a function to invoke based on the architecture of the second computing device; and execute the function in response to the secure call being invoked.

8. A method for data processing unit (DPU) integration in a combined server and DPU solution, comprising:
provide a networked environment that comprises a server computing device and a DPU communicatively coupled to one another, with the server computing device containing the DPU, and the server computing and the DPU being of a different type and manufacturer;
executing a DPU operating system on the DPU, wherein the DPU operating system exercises a plurality of secure calls implemented by DPU trusted firmware to be invoked by components of the DPU operating system;
identifying an invocation of one of the secure calls made on DPU to communicate with the server computing device containing the DPU;
in an instance in which the one of the secure calls is invoked, translating the one of the secure calls into a call or request specific to the architecture of the server containing the DPU; and
executing the call, wherein the call being as executed comprises sending a signal to the server computing device in a format interpretable by the server computing device; wherein
the DPU implements a reduced instruction set computer (RISC) architecture capable of executing the DPU operating system;
the server computing device comprises a baseboard management controller (BMC); and
the one of the secure calls made to the DPU is a secure monitor call (SMC) translated to a request to the baseboard management controller of the server computing device, the secure monitor call being a call compliant with the RISC architecture.

9. The method of claim 8, wherein the signal sent to the server computing device is a fatal peripheral component interconnect express (PCIe) error interrupt that directs an operating system of the server computing device to detect fatal errors on endpoints visible to the operating system of the server computing device due to a malfunction of the one of the DPUs or the DPU operating system of the one of the DPUs.

10. The method of claim 8, wherein the signal sent to the server computing device is a power-on self-test code or DPU operating system service status sent to the baseboard management controller of the server computing device.

11. The method of claim 8, wherein the signal sent to the server computing device is a DPU halt request communicated as an advanced configuration and power interface (ACPI) power button device event.

12. The method of claim 8, wherein the signal sent to the server computing device to the DPU is a baseboard management controller-requested crash request.

13. The method of claim 8, wherein:
the one of the DPUs is a first computing device;
the server system further comprises a second computing device;

the one of the secure calls from the DPU operating system is translated into the call specific to the architecture of the first computing device by: identifying the architecture of the first server computing device; identifying a function to invoke based on the architecture of the first server computing device; and executing the function in response to the secure call being invoked; and the at least one hardware processor of the DPU is further directed to identify the architecture of the second computing device; identify a function to invoke based on the architecture of the second computing device; and execute the function in response to the secure call being invoked.

14. A non-transitory computer-readable medium having program instructions stored thereon executable by a data processing unit (DPU) having at least one hardware processor that, when executed by the at least one hardware processor, direct the DPU to:
execute a DPU operating system on the network interface card, wherein the DPU operating system exercises a plurality of secure calls implemented by DPU trusted firmware to be invoked by processes of the DPU operating system;
identify an invocation of one of the secure calls made on the DPU to communicate with the server computing device; and
in an instance in which the one of the secure calls is invoked, translate the one of the secure calls into a call or request specific to an architecture of the server computing device and perform the call, wherein the call being performed comprises sending a signal to the server computing device in a format interpretable by the server computing device; wherein
the DPU implements a reduced instruction set computer (RISC) architecture capable of executing the DPU operating system;
the server computing device comprises a baseboard management controller (BMC); and
the one of the secure calls made to the DPU is a secure monitor call (SMC) translated to a request to the baseboard management controller of the server computing device, the secure monitor call being a call compliant with the RISC architecture.

15. The non-transitory computer-readable medium of claim 14, wherein the signal sent to the server computing device is a fatal peripheral component interconnect express (PCIe) error interrupt that directs an operating system of the server computing device to notify endpoints visible to the operating system of the server computing device.

16. The non-transitory computer-readable medium of claim 14, wherein the signal sent to the server computing device is a power-on self-test code or DPU operating system service status sent to the baseboard management controller of the server computing device.

17. The non-transitory computer-readable medium of claim 14, wherein:
the signal sent to the server computing device is a DPU halt request communicated as an advanced configuration and power interface (ACPI) power button device event; or
the signal sent to the service computing device is a baseboard management controller crash request.

* * * * *